(12) United States Patent
Goubard et al.

(10) Patent No.: US 8,263,696 B2
(45) Date of Patent: Sep. 11, 2012

(54) HOT MELT PRESSURE SENSITIVE ADHESIVES FOR PAPER LABELS

(75) Inventors: David Goubard, Compiegne (FR); Robert John Haeger, Hales Corner, WI (US)

(73) Assignee: Bostik, S.A., Courbevoie (FR)

( * ) Notice: Subject to any disclaimer, the term of this patent is extended or adjusted under 35 U.S.C. 154(b) by 161 days.

(21) Appl. No.: 12/345,543

(22) Filed: Dec. 29, 2008

(65) Prior Publication Data

US 2009/0220807 A1 Sep. 3, 2009

Related U.S. Application Data

(63) Continuation of application No. 11/643,912, filed on Dec. 22, 2006, now abandoned.

(51) Int. Cl.
*C08L 53/02* (2006.01)
*C08L 25/06* (2006.01)
*B32B 27/10* (2006.01)

(52) U.S. Cl. ............ 524/476; 524/490; 524/505; 525/89

(58) Field of Classification Search ............. 525/89; 524/476, 490, 505

See application file for complete search history.

(56) References Cited

U.S. PATENT DOCUMENTS

| 4,132,690 | A | * | 1/1979 | Eernstman et al. | 524/270 |
|---|---|---|---|---|---|
| 5,000,802 | A | * | 3/1991 | Ikeda et al. | 149/2 |
| 5,163,976 | A | * | 11/1992 | Ravipati et al. | 51/295 |
| 5,412,032 | A | * | 5/1995 | Hansen et al. | 525/98 |
| 5,414,039 | A | * | 5/1995 | Watson et al. | 524/502 |
| 5,777,039 | A | * | 7/1998 | De Craene et al. | 525/314 |
| 6,060,550 | A | | 5/2000 | Simon et al. | |
| 6,214,935 | B1 | | 4/2001 | Sasaki et al. | |
| 6,479,126 | B1 | * | 11/2002 | Yang et al. | 428/102 |
| 2003/0226997 | A1 | * | 12/2003 | Balian et al. | 252/71 |
| 2004/0062923 | A1 | | 1/2004 | Joseph et al. | |
| 2004/0116581 | A1 | * | 6/2004 | Hansen | 524/474 |
| 2005/0234195 | A1 | | 10/2005 | St. Clair et al. | |
| 2006/0070543 | A1 | * | 4/2006 | De Keyzer et al. | 101/453 |

FOREIGN PATENT DOCUMENTS

WO WO 99/20708 4/1999

OTHER PUBLICATIONS

Office Action mailed on Jun. 26, 2006 from the USPTO in related U.S. Appl. No. 11/643,912.

* cited by examiner

*Primary Examiner* — Jeffrey Mullis
(74) *Attorney, Agent, or Firm* — Hunton & Williams LLP

(57) ABSTRACT

A HMPSA is provided that preferably includes at least a) from 30 to 50% of a mixture of triblock and diblock styrenic copolymers having an overall styrene content comprised between 14 and 40%, b) from 40 to 55% of a tackifying resin with a softening temperature comprised between 70 and 150° C. obtainable by hydrogenating, polymerizing or copolymerizing mixtures of aliphatic unsaturated hydrocarbons having about 5, 9 or 10 carbon atoms; c) from 4 to 20% of a hydrocarbon oil with an aromatic content less than 15%; d) from 1 to 6% of a filler selected among calcium carbonate or a low molecular weight homopolymer or copolymer of polyethylene. A laminated system is also provided that includes at least an adhesive layer utilizing the HMPSA and paper facestock. Also included are PSA labels obtainable from the laminated system with a reduced tendency to discolor after storage.

25 Claims, No Drawings

HOT MELT PRESSURE SENSITIVE ADHESIVES FOR PAPER LABELS

The present invention is concerned with a Hot Melt Pressure Sensitive Adhesive (HMPSA) compositions and systems. The HMPSA systems include a laminate comprising an adhesive layer consisting of said HMPSA and a paper facestock. The HMPSA systems also include a permanent Pressure Sensitive Adhesive label obtainable from the laminated system.

BACKGROUND OF THE INVENTION

A Pressure Sensitive Adhesive (PSA) is an adhesive whose coating on the surface of paper or film makes it permanently tacky at room temperature and enables the surface to adhere readily on a substrate under light and brief pressure. PSAs are largely used for the manufacturing of labels, in particular paper based labels, which are fixed on articles for information presentation purposes (such as bar code, name, price) and/or for mere ornamental purposes.

PSAs are generally applied by continuous coating processes on a large surface of a support layer, made of a base material (also called facestock) which consists of paper or of a plastic film. The adhesive layer which coats this support layer is protected by a release liner consisting of, for instance, siliconized paper. The resulting laminated system is generally produced so as to be wound up on itself under the form of large rolls of up to 2 m in width and 1 m in diameter, which is an appropriate dimension for storage and transport.

This laminated system may be subsequently converted into commercially useful labels after further processing steps which include printing and cutting. Such labels are generally designated as pressure-sensitive or self-adhesive labels or PSA labels. After removal of the release liner, these labels may be adhered to a substrate, such as an article to be labeled, generally by means of an automated labeling equipment, for instance on the packaging lines of the end-user's industrial site. PSAs, due to their high tack, enable the manufacturing of self-adhesive labels which adhere in a very short time to substrates, which increases manufacturing output.

A Hot Melt Adhesive (HM) is a solventless and waterless adhesive that is solid at room temperature. HMs are applied in the molten state and solidify when cooled down, thereby forming a bond which secures the two substrates to be assembled. Some HMs are formulated in such a way as to give to the corresponding coated substrate a relatively hard and tackless character. Other HMs result in coated substrates with a relatively soft character and a high tack—these HMs are PSAs which are largely used for the manufacturing of PSA labels. Such adhesives are designated under the name of Hot Melt Pressure Sensitive Adhesive (or HMPSA).

Some of these HMPSAs are designed to provide labels (in particular paper based labels) with high adhesive performance, which can be permanently fixed on the articles to be labeled. Once removed from the release liner and adhered to a substrate, these labels tear on any attempt to remove them. Such HMPSAs are also designated as permanent HMPSA, in contrast to removable HMPSAs which are designed to provide labels which once adhered to a substrate must be able to be removed from the substrate after a residence time, and adhered to it again.

HMPSAs generally comprise a thermoplastic polymer (in particular elastomeric block copolymers) in combination with tackifying resins and plasticizers.

When such HMPSAs are coated onto a support layer (or facestock) made of paper in order to manufacture a label, there is the frequent problem that the color of the paper surface of the facestock opposite the coated surface changes over time, especially during storage at temperatures above room temperature. This change of color may take the form of stains or of a loss of whiteness. While it is believed that this discoloration may be due to some migration of low molecular weight compounds present in the HMPSA such as certain tackifiers, it is certainly undesirable from an aesthetic point of view.

Such drawbacks have been avoided by means of a preliminary treatment of the paper layer before coating the HMPSA, thereby creating an intermediate oil barrier. However this treatment complicates the overall manufacturing process of the laminated system.

U.S. Pat. No. 6,214,935 describes HMPSA compositions characterized by less bleed and staining tendencies. These HMPSAs are based on elastomeric components such as styrenic block copolymers and tackifying resins with softening points ranging from about 35 to 60° C.

WO 99/20708 relates to a HMPSA based on a block copolymer having a high level of diblock which exhibits minimal staining of paper. However this HMPSA is a removable grade whose adhesive performance is insufficient for designing a permanent PSA label.

BRIEF SUMMARY OF THE INVENTION

The HMPSAs according to the present invention exhibit one or more of the following properties: a reduced tendency to discolor or stain paper after being coated thereon, a reduced tendency to discolor or stain after storage of the corresponding laminated system at temperatures well above room temperature, and high tack and adhesive performance on a variety of substrates.

DETAILED DESCRIPTION OF THE INVENTION

In accordance with one aspect of the present invention, there is provided a hot melt pressure sensitive adhesive (HMPSA) composition comprising:

a) from 30 to 50% of a mixture of styrenic block copolymers consisting of:
  10 to 70% of at least one $SX^1S$ triblock copolymer, and
  30 to 90% of at least one $SX^2$ diblock copolymer;
  wherein:
    S represents a polymerized segment of a styrene monomer,
    $X^1$ and $X^2$, identical or different, represent each an elastomeric polymerized segment of one or two monomers selected from the group consisting of isoprene, butadiene, and their respective hydrogenated derivatives;
  and wherein the overall styrene monomer content in said mixture is comprised between 14 and 40%;

b) from 40 to 55% of one or more tackifying resin(s) with a softening temperature comprised between 70 and 150° C. comprising a tackifying resin (i) obtainable by hydrogenating, polymerizing or copolymerizing mixtures of aliphatic unsaturated hydrocarbons having about 5, 9 or 10 carbon atoms;

c) from 4 to 20% of a hydrocarbon oil with an aromatic content less than 15%;

d) from 1 to 6% of a filler selected among calcium carbonate or a low molecular weight homopolymer or copolymer of polyethylene.

Unless indicated to the contrary, the percentages used in the present application designate the content of the various components by weight/weight (w/w) percentage.

The composition according to the invention advantageously gives to the laminated system a high tack at room temperature resulting from its coating on a support layer, which makes the laminated system particularly useful as a PSA label. This high tack is further exhibited at low temperature at around 2° C., which makes possible the labeling of cold articles, such as refrigerated foodstuffs packaged in a plastic film—for instance: fruit, vegetable or meat. Moreover, the laminated system also possesses very good adhesive performance which enables permanent fixing of the resulting label on the various substrates of the articles to be labeled. Finally, when coated on high gloss white paper, the composition according to the invention exhibits reduced staining or discoloration of the paper after storage of the laminate at a temperature of about 75° C. and under pressure.

The styrenic triblock and diblock copolymers comprised in the composition according to the invention have a weight average molecular weight $M_w$ comprised between 60 and 420 kDa and may be linear or radial. Unless indicated to the contrary, the average molecular weights $M_w$ used in the present application are given in dalton (Da) and are determined by Gel Permeation Chromatography, the column being calibrated by a polystyrene standard. These styrenic block copolymers are well known in the art and are commercially available.

Preferred mixtures of $SX^1S$ triblock and $SX^2$ diblock copolymers include 10 to 30% of triblocks and 70 to 90% of diblocks. Further preferred mixtures of $SX^1S$ triblock and $SX^2$ diblock are such that the elastomeric polymerized segments $X^1$ and $X^2$ consist of the same monomer. The overall styrene monomer content is more preferably from 15 to 30%.

A preferred composition according to the invention comprises a mixture of styrenic $SX^1S$ triblock and $SX^2$ diblock copolymers wherein $X^1$ and $X^2$ represent a polymerized segment of isoprene or a polymerized segment of butadiene. Such copolymers are also designated as SIS, SI, SBS or SB block copolymers. Examples may include:

Europrene® Sol T6320 which is a mixture of around 25% of a styrene-butadiene-styrene (or SBS) linear block copolymer ($M_w$ of about 170 kDa) and around 75% of SB diblock ($M_w$ of about 70 kDa). This mixture contains 30% styrene and is commercially available from Polimeri Europa.

DPX® 586 which is a mixture of around 20% of a styrene-isoprene-styrene (or SIS) radial block copolymer ($M_w$ of about 420 kDa) and around 80% of SI diblock ($M_w$ of about 110 kDa). This mixture contains 19% styrene by weight and is commercially available from Exxon.

Solprene® 1205 which is a styrene-butadiene (or SB) diblock copolymer having about 30% styrene and a $M_w$ of about 100 kDa, commercially available from Dynasol.

Kraton® D1113 BT which is a mixture of around 44% of a SIS linear block copolymer ($M_w$ of about 190 kDa) and around 56% of SI diblock ($M_w$ of about 97 kDa). This mixture contains 15% styrene and is commercially available from Kraton.

Other block copolymers which may be used in the HMPSA composition according to the invention include those deriving from the triblocks SIS and SBS by hydrogenation of the midblock. Such block copolymers are also known as styrene-ethylene-butylene-styrene (SEBS) or styrene-ethylene-propylene-styrene (SEPS). The HMPSA compositions may also comprise block copolymers of the SIBS type which are for instance described in US 2005/0137312 published on Jun. 23, 2005.

The HMPSA composition according to the invention comprises one or more tackifying resin(s), each with a softening temperature comprised between 70 and 150° C. The overall amount of these tackifying resins in the HMPSA composition is comprised between 40 to 55%.

These tackifying resins comprise one or more tackifying resin (i) obtainable by hydrogenating, polymerizing or copolymerizing (with an aromatic hydrocarbon) mixtures of aliphatic unsaturated hydrocarbons having about 5, 9 or 10 carbon atoms, said mixtures being issued from the cracking of naphta.

According to an embodiment of the HMPSA composition, the tackifying resin(s) (i) are in admixture with up to 50% (based on the total weight of said admixture) of one or more tackifying resin(s) selected in the group consisting of:

a tackifying resin (ii) consisting of a natural or chemically modified rosin;

a tackifying resin (iii) consisting of a terpenic resin, optionally modified by action of phenols; and a tackifying resin (iv) consisting of a copolymer based on a natural terpene.

Each of the tackifying resins (ii), (iii) and (iv) optionally included in admixture with resin (i) in the present HMPSA composition also possesses—like resin (i)—a softening temperature comprised between 70 and 150° C. Preferably said admixture comprises about 50% of resin (i) and about 50% of resin (ii), (iii) or (iv).

With respect to tackifying resin (ii), one may cite as examples of natural rosin: gum rosin harvested from a living tree, wood rosin harvested from the roots of the trees, tall oil rosin harvested from the by-product of the paper industry. Chemically modified rosin include rosin modified by such processes as hydrogenation, dehydrogenation, dimerization, polymerization or esterification by alcohols including polyols such as penta-erythritol.

With respect to tackifying resin (iii), terpenic resins generally result from the polymerization of terpenic hydrocarbons such as for example mono-terpene (or pinene) in the presence of a Friedel-Crafts catalyst.

With respect to tackifying resin (iv), one may cite as examples of copolymers based on natural terpenes, styrene/terpene, alpha-methyl styrene/terpene and vinyl toluene/terpene copolymers.

The tackifying resins (i), (ii), (iii) and (iv) have an average weigh molecular weight $M_w$ which is generally comprised between 300 and 5000 Da. They are commercially available and one may refer for example among the above families to the following products:

(i) Wingtack® 86 from the company Cray Valley which is an aromatically modified C5 hydrocarbon resin with a softening temperature of 86° C. and a Mw of about 1670 Da; Escorez® 5600 from the company Exxon Chemicals which is a hydrogenated dicyclopentadiene modified by an aromatic compound, having a softening temperature of 100° C. and a Mw of about 980 Da; Escorez® 5690 from the same company which is a hydrogenated dicyclopentadiene modified by an aromatic compound, having a softening temperature of 90° C. and a Mw of 800 Da;

(ii) Sylvalite® RE 100 L from the company Arizona Chemical which is a rosin esterified with pentaerethritol, having a softening temperature of 100° C. and a Mw of 1700 Da;

(iii) Sylvarez® TP 95 from the same company which is a terpene phenolic resin with a softening temperature of 95° C. and a Mw of about 1120 Da;

(iv) Sylvarez® ZT 105LT from the same company which is a styrene/terpene copolymer with a softening temperature of 105° C.

The softening temperature of the resin is determined by the standardized ASTM E 28 test using the Ring-and-Ball apparatus, whose principle is the following. A brass ring with a diameter of about 2 cm is filled with the resin to be tested, in the molten state. After cooling down at room temperature, the ring and the resin in the solid state are arranged according to a horizontal position within a glycerin bath whose temperature can be raised uniformly at a rate of 5° C. per minute. A steel ball of about 9.5 mm in diameter is centered on the disk of solid resin. The softening point is the temperature at which the disk of resin is forced downward a distance of 25.4 mm under the weight of the ball.

The preferred tackifying resins have a softening temperature comprised between 80 and 140° C., and more preferably between 85 and 110° C.

The hydrocarbon oil which may be used as component c) in the composition according to the invention has an aromatic content which is less than 15%, preferably less than 7%.

The aromatic content of the oil is the percentage in weight of aromatic carbons divided by the sum of weights of paraffinic, aromatic and naphthenic carbons. The quantity of aromatic, paraffinic and naphthenic carbons are determined by standard measurements known to one skilled in the art and based on Infra Red spectroscopy. Preferably an oil with substantially equal naphthenic and paraffinic content is used. Such hydrocarbon oils are commercially available. One may cite as an example Nyplast® 222B available from Nynas which has 5% aromatic carbon, 47% paraffinic carbon, 48% naphthenic carbon.

Calcium carbonate which may be used as the filler d) of the HMPSA composition according to the invention is preferably implemented as a powder of fine particles of an average size less than 10 μm, more preferably less than 5 μm, and even more preferably of about 2 μm.

Preferably, the filler is a homopolymer or copolymer of polyethylene with an average number molecular weight comprised between 1 and 5 kDa. Such products are available commercially, for instance AC8® from Honeywell is a homopolymer of polyethylene having an average number molecular weight of 2800 Da and a polydispersity index of 1.69, AC400 from the same company is a copolymer of polyethylene and vinyl acetate having an average number molecular weight between 1 and 3 kDa.

According to a preferred embodiment, the HMPSA composition according to the invention comprises:
from 32 to 40% of component a);
from 45 to 50% of component b);
from 10 to 20% of component c); and
from 3 to 5% of component d).

A quantity of 0.5 to 2% of one or more stabilizer or antioxidant is preferably included in the HMPSA composition of the invention. These compounds are added to protect the adhesive from degradation caused by reaction with oxygen likely to be induced from heat, light or residual catalyst from the raw materials such as the tackifying resin. These compounds may include primary antioxidants which act as radical scavengers and are generally hindered phenols such as Irganox® 1010 from CIBA. The primary antioxidants may be used alone or in combination with other antioxidants such as phosphites such as Irgafos® 168 from CIBA or sulfites such as Irganox® PS800 from the same company.

Other components like dyes, pigments or coloring agents may also be incorporated in the HMPSA composition.

The viscosity of the HMPSA composition according to the invention, as measured by a Brookfield® RVT viscometer, is preferably comprised between 4000 and 50 000 mPa·s at 163° C., and more preferably between 8000 and 30 000 mPa·s at 163° C.

The HMPSA composition of the present invention may be prepared by a simple mixture of its components in a batch or semi-batch mixer at a temperature comprised between 130 and 200° C. The mixing techniques are well known from one skilled in the art.

In accordance with another aspect of the present invention, there is provided a laminated system comprising:
an adhesive layer consisting of the HMPSA composition according to the invention,
a paper facestock in contact with said adhesive layer, and
a release liner in contact with the adhesive layer.

The paper used as a facestock has generally a grammage comprised between 60 and 100 g/m$^2$ and is often a high gloss paper or vellum paper, preferably white. The release liner protects the adhesive layer prior to application to a substrate and may be for instance a siliconized Kraft paper liner.

For the manufacture of this laminated system, the HMPSA composition is coated on or otherwise applied to the paper facestock or, more preferably, coated on the release liner and then laminated to the paper facestock. Coating is achieved by techniques well known to one skilled in the art such as roll coating, slot die coating or curtain coating at temperatures from about 120 to 175° C. The coating weight of the HMPSA may be comprised between 15 and 30 g/m$^2$.

In accordance with still another aspect of the present invention, there is provided a self-adhesive label obtainable by conversion of the laminated system according to the invention. Conversion techniques include slitting, die-cutting and matrix-stripping.

The adhesive performance of the HMPSA composition according to the invention is assessed by the Peel 180° test on stainless steel, such as described by the FINAT test method n° 1, published in the Manuel Technique FINAT 6$^{th}$ edition, 2001. FINAT is the international federation of manufacturers and converters of adhesives and hot-melts on paper and other supports. The principle of this test if as follows. The HMPSA is first of all coated on a 50 μm thickness PolyEthylene-Terephtalate (PET) film at a weight of 20 g/m$^2$. The resulting laminate is cut into a rectangular strip (25 mm×175 mm) which is adhered to a substrate consisting of a stainless steel panel. This assembly is allowed to stay 20 minutes at room temperature. It is then introduced in a traction apparatus able to peel the strip at 180° angle at a rate of 300 mm per minute. The force required to effect peel is measured in these conditions. The result is expressed in N/cm. The Peel 180° value on stainless steel for a HMPSA suitable for permanent PSA labels is usually greater than 4 N/cm, preferably greater than 7 N/cm.

The tack at room temperature obtained by the HMPSA according to the invention is assessed by the loop tack test described in the FINAT n° 9 method of test also published in the Manuel Technique FINAT 6$^{th}$ edition, 2001. The HMPSA is first of all coated in order to obtain a rectangular strip (25 mm×175 mm) as described here above. The two ends of this strip are joined in a loop (the adhesive layer being outward) and are fixed in the mobile jaw of a traction apparatus able to move up and down at a speed of 300 mm/minute along a vertical axis. The lower part of the loop is first allowed to move down in order to contact a horizontal glass panel of 25 mm width and 30 mm length, the contact zone being a square of about 25 mm×25 mm. As soon as the contact occurs, the direction of the displacement is reversed. The loop tack is the value of the force required for the loop to separate completely from the glass panel. The loop tack of a PSA is generally greater than 1.3 N/cm².

The tack at +2° C. is assessed by the probe tack test. A stainless steel cylindrical probe with a 5 mm diameter is linked to a load cell equipped with a force sensor. The end of this probe is brought into and out of contact with a layer of the HMPSA coated on a PET film of 50 μm thickness, while recording the applied displacement and the resulting force. The load cell and the probe are part of a texture analyzer; the layer of HMPSA and the probe are enclosed in a thermal chamber maintained at a temperature of +2° C. The probe tack is the maximum force recorded during debonding of the probe end and is expressed in N/cm².

The tendency to paper staining of the HMPSA composition according to the invention is assessed by the following test. The HMPSA is coated at a temperature of about 160° C. on a release liner and then laminated to a paper facestock. Coating is achieved by means of a slot die nozzle. The paper facestock is a 70 g/m² white high gloss paper. The coating weight of the adhesive is 20 g/m².

The laminated system is cut into 21×29.7 cm sheets which are stored during 7 days at 75° C. under a pressure of 32 kg/m².

The discoloration ΔE of the paper facestock is calculated by means of a measurement carried out by a colormeter before and after storage of the sheets. Based on the color model designated as CIE L*a*b*, this apparatus (a Minolta Chromameter CR 200) determines for a light source of reference (of D type, namely $D_{65}$ corresponding to a color temperature of 6 504 K) 3 parameters for a specific color: its lightness (L*), its position between magenta and green (a*) and its position between yellow and blue (b*).

The measurement carried out before storage results therefore in the 3 parameters: $L^*_0$, $a^*_0$, $b^*_0$; while the measurement carried out after storage results in the 3 parameters: $L^*_{storage}$, $a^*_{storage}$, $b^*_{storage}$.

Discoloration ΔE is calculated by the formula:

$$\Delta E = [(L^*_0 - L^*_{storage})^2 + (a^*_0 - a^*_{storage})^2 + (b^*_0 - b^*_{storage})^2]^{1/2}$$

The present invention will now be further illustrated by the following, non limiting examples.

The following HMPSA compositions were prepared by simple mixing of the ingredients between 160 and 180° C.

All these compositions contained 0.5% of Irganox® 1010 and 0.5% of Irganox® PS800. The content of the remaining components is detailed in % in the following Table 1.

The viscosities of these compositions were measured by a Brookfield® RVT viscometer at 163° C. The resulting values, as well as the results of the tests described here-above are given in the following Table 2.

The exemplified HMPSA compositions provide an acceptable discoloration ΔE of the paper facestock in severe storage conditions of the laminated system, while showing advantageous properties of tack and adhesion through the Peel 180° test. These properties make these compositions particularly suited for the manufacturing of PSA labels.

Further, the labels obtained by coating (at a weight of 20 g/m²) each of these compositions on a 80 g/m² paper were first bonded onto glass, then peeled with an angle of 180°. During this peeling step, all the labels exhibited some fiber tears. The exemplified HMPSA are therefore particularly suited for the manufacturing of permanent PSA labels.

TABLE 1

| Component | | Commercial name | Ex. 1 | Ex. 2 | Ex 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| (a) | | DPX ® 586 | 32.5 | | | | | | | 18 | | | |
| | | Kraton ® D1113BT | | | | | | | | | 10 | | |
| | | Europrene ® Sol T6320 | | 38 | 32.5 | 35 | 30 | 25 | 35 | 17 | 25 | 35 | 35 |
| | | Solprene ® 1205 | | | | | 5 | 10 | | | | | |
| (b) | (i) | Wingtack ® 86 | 45.5 | | | | | | | 23 | | | |
| | | Escorez ® 5600 | | 46 | 45.5 | 47 | 23 | 23 | | 24 | 23 | 23.5 | 24 |
| | | Escorez ® 5690 | | | | | | | 47 | | | | |
| | (ii) | Sylvalite ® RE 100 L | | | | | | | | | | 23.5 | |
| | (iii) | Sylvarez ® TP 95 | | | | | 24 | 24 | | | 24 | | |
| | (iv) | Sylvarez ® ZT 105LT | | | | | | | | | | | 23 |
| (c) | | Nyplast ® 222B | 18 | 12 | 18 | 12 | 12 | 12 | 12 | 12 | 12 | 12 | 12 |
| (d) | | AC8 ® | 3 | 3 | 3 | 5 | 5 | 5 | 5 | 5 | 5 | 5 | 5 |
| Styrenic block copolymers mixture | | Copolymers nature | SIS + SI | SIS + SI | SBS + SB | SBS + SB | SBS + SB | SBS + SB | SBS + SB | SBS + SB + SIS + SI | SBS + SB + SIS + SI | SBS + SB | SBS + SB |
| | | % diblock | 80 | 75 | 75 | 75 | 79 | 82 | 75 | 77 | 70 | 75 | 75 |
| | | % styrene | 19 | 30 | 30 | 30 | 30 | 30 | 30 | 24 | 26 | 30 | 30 |

TABLE 2

| Test results | Ex. 1 | Ex. 2 | Ex 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Viscosity at 163° C. (Pa · s) | 8 | 30 | 10 | 24 | 15 | 16 | 16 | 15 | 17 | 18 | 18 |
| Peel 180° on stainless steel (N/cm) | 10 | 8 | 9 | 7.5 | 7 | 12 | 7.2 | 9 | 7.2 | 8 | 10 |
| Loop tack (N/cm²) | 3.7 | 4 | 5 | 3.6 | 4.2 | 5.6 | 4 | 4 | 4.8 | 5 | 4.5 |
| Probe tack at +2° C. (N/cm²) | 1.24 | 0.6 | 1.09 | 0.47 | 0.55 | 1.2 | 0.55 | 0.78 | 0.48 | 0.3 | 0.3 |
| ΔE | 2.5 | 1.4 | 2.3 | 1.9 | 1.6 | 1.6 | 1.7 | 1.9 | 1.7 | 2.5 | 2.3 |

The invention claimed is:

1. A hot melt pressure sensitive adhesive (HMPSA) composition comprising:
   a) from 30 to 50% of a mixture of styrenic block copolymers comprising:
      10 to 70% of at least one $SX^1S$ triblock copolymer, and
      30 to 90% of at least one $SX^2$ diblock copolymer;
   wherein:
      S represents a polymerized segment of a styrene monomer,
      $X^1$ and $X^2$, are identical or different, and each represents an elastomeric polymerized segment of one or two monomers comprising isoprene, butadiene or their respective hydrogenated derivatives;
   wherein the overall styrene monomer content in said mixture of styrenic block copolymers is between 14 and 40%;
   b) from 40 to 55% of one or more tackifying resin(s), each of the one or more tackifying resin(s) having a softening temperature of between 70 and 150° C., wherein the one or more tackifying resin(s) comprises a tackifying resin (i) obtainable by hydrogenating, polymerizing or copolymerizing mixtures of aliphatic unsaturated hydrocarbons having from 5, 9 or 10 carbon atoms;
   c) from 4 to 20% of a hydrocarbon oil with an aromatic content less than 15%; and
   d) from 1 to 6% of a filler comprising a low number average molecular weight homopolymer or copolymer of polyethylene.

2. The HMPSA composition according to claim 1, wherein the mixture of styrenic block copolymers includes 10 to 30% of $SX^1S$ triblocks and 70 to 90% of $SX^2$ diblocks.

3. The HMPSA composition according claim 1, wherein the elastomeric polymerized segments $X^1$ and $X^2$ are the same monomer.

4. The HMPSA composition according to claim 1, wherein the overall styrene monomer content in said mixture of styrenic block copolymers is from 15 to 30%.

5. The HMPSA composition according to claim 1, wherein $X^1$ and $X^2$ represent a polymerized segment of isoprene or a polymerized segment of butadiene.

6. The HMPSA composition according to claim 1, wherein the tackifying resin(s) (i) are in admixture with up to 50% of one or more tackifying resin(s) comprising:
   a tackifying resin (ii) comprising a natural or chemically modified rosin;
   a tackifying resin (iii) comprising a terpenic resin, optionally modified by action of phenols; or
   a tackifying resin (iv) comprising a copolymer based on a natural terpene.

7. The HMPSA composition according to claim 6, wherein the admixture comprises about 50% of resin (i) and about 50% of resin (ii), (iii) or (iv).

8. The HMPSA composition according to claim 1, wherein the softening temperature of each of the one or more tackifying resin(s) is between 80 and 140° C.

9. The HMPSA composition according to claim 1, wherein the hydrocarbon oil has an aromatic content which is less than 7%.

10. The HMPSA composition according to claim 1, comprising:
    from 32 to 40% of component a);
    from 45 to 50% of component b);
    from 10 to 20% of component c); and
    from 3 to 5% of component d).

11. The HMPSA composition according to claim 1, further comprising 0.5 to 2% of one or more stabilizer or antioxidant.

12. A laminated system comprising:
    an adhesive layer comprising the HMPSA composition as defined in claim 1,
    a paper facestock in contact with said adhesive layer, and
    a release liner in contact with the adhesive layer.

13. The laminated system according to claim 12, wherein the paper is a white paper comprising a grammage of between 60 and 100 g/m$^2$.

14. A self-adhesive label comprising the laminated system of claim 12.

15. The HMPSA composition according to claim 1, wherein the softening temperature of each of the one or more tackifying resin is between 85 and 110° C.

16. A hot melt pressure sensitive adhesive (HMPSA) composition comprising:
    a) from 30 to 50% of a mixture of styrenic block copolymers comprising:
       10 to 70% of at least one $SX^1S$ triblock copolymer, and
       30 to 90% of at least one $SX^2$ diblock copolymer;
    wherein:
       S represents a polymerized segment of a styrene monomer,
       $X^1$ and $X^2$, are identical or different, and each represents an elastomeric polymerized segment of one or two monomers comprising isoprene, butadiene or their respective hydrogenated derivatives;
    b) from 40 to 55% of one or more tackifying resin(s), each of the one or more tackifying resin(s) having a softening temperature of between 70 and 150° C., wherein the one or more tackifying resin(s) comprises a tackifying resin (i) obtainable by hydrogenating, polymerizing or copolymerizing mixtures of aliphatic unsaturated hydrocarbons having from 5, 9 or 10 carbon atoms;
    c) from 4 to 20% of a hydrocarbon oil with an aromatic content less than 15%; and
    d) from 1 to 6% of a filler comprising a low molecular weight homopolymer or copolymer of polyethylene with an average number molecular weight between 1 and 5 kDa.

17. A hot melt pressure sensitive adhesive (HMPSA) composition comprising:
    a) from 30 to 50% of a mixture of styrenic block copolymers comprising:
       10 to 70% of at least one $SX^1S$ triblock copolymer, and
       30 to 90% of at least one $SX^2$ diblock copolymer;
    wherein:
       S represents a polymerized segment of a styrene monomer,
       $X^1$ and $X^2$, are identical or different, and each represents an elastomeric polymerized segment of one or two monomers comprising isoprene, butadiene or their respective hydrogenated derivatives;
    b) from 40 to 55% of one or more tackifying resin(s), each of the one or more tackifying resin(s) having a softening temperature between 70 and 150° C., wherein the one or more tackifying resin(s) comprises a tackifying resin (i) obtainable by hydrogenating, polymerizing or copolymerizing mixtures of aliphatic unsaturated hydrocarbons having from 5, 9 or 10 carbon atoms;

c) from 4 to 20% of a hydrocarbon oil with an aromatic content less than 15%; and d) from 3 to 5% of a filler comprising a low number average molecular weight homopolymer or copolymer of polyethylene.

18. A hot melt pressure sensitive adhesive (HMPSA) composition comprising:
    a) from 30 to 50% of a mixture of styrenic block copolymers comprising:
       10 to 70% of at least one $SX^1S$ triblock copolymer, and
       30 to 90% of at least one $SX^2$ diblock copolymer;
       wherein:
          S represents a polymerized segment of a styrene monomer,
          $X^1$ and $X^2$, are identical or different, and each represents an elastomeric polymerized segment of one or two monomers comprising isoprene, butadiene or their respective hydrogenated derivatives;
    b) from 40 to 55% of one or more tackifying resin(s), each of the one or more tackifying resin(s) having a softening temperature between 70 and 150° C., wherein the one or more tackifying resin(s) comprises a tackifying resin (i) obtainable by hydrogenating, polymerizing or copolymerizing mixtures of aliphatic unsaturated hydrocarbons having from 5, 9 or 10 carbon atoms;
    c) from 4 to 20% of a hydrocarbon oil with an aromatic content less than 15%; and
    d) from 3 to 5% of a filler comprising a low molecular weight homopolymer or copolymer of polyethylene with a number average molecular weight between 1 and 5 kDa.

19. A hot melt pressure sensitive adhesive (HMPSA) composition comprising:
    a) from 25 to 35% of a mixture of styrenic block copolymers comprising:
       a first mixture comprising about 25% of a styrene-butadiene-styrene copolymer having a weight average molecular weight of about 170 kDa and about 75% of a styrene-butadiene copolymer having a weight average molecular weight of about 70 kDa, wherein said first mixture comprises about 30% styrene, and
       a second mixture comprising a styrene-butadiene copolymer having about 30% styrene and a weight average molecular weight of about 100 kDa;
    b) about 47% of a tackifying resin comprising a hydrogenated dicyclopentadiene modified by an aromatic compound, having a softening temperature of about 100° C.; a hydrogenated dicyclopentadiene modified by an aromatic compound, having a softening temperature of about 90° C.; a terpene phenolic resin, having a softening temperature of about 95° C.; or mixtures thereof;

c) from 12 to 18% of a hydrocarbon oil comprising about 5% aromatic hydrocarbon, about 47% paraffinic carbon, and about 48% naphthenic carbon;

d) from 3 to 5% of a filler comprising a low molecular weight homopolymer or copolymer of polyethylene with an average number molecular weight between 1 and 5 kDa.

20. The HMPSA composition according to claim 1, wherein the composition exhibits a ΔE of from about 1.4 to about 2.5.

21. A hot melt pressure sensitive adhesive (HMPSA) composition comprising:
    a) from 30 to 50% of a mixture of styrenic block copolymers comprising:
       10 to 70% of at least one $SX^1S$ triblock copolymer, and
       30 to 90% of at least one $SX^2$ diblock copolymer;
       wherein:
          S represents a polymerized segment of a styrene monomer,
          $X^1$ and $X^2$, are identical or different, and each represents an elastomeric polymerized segment of one or two monomers comprising isoprene, butadiene or their respective hydrogenated derivatives;
       wherein the overall styrene monomer content in said mixture of styrenic block copolymers is between 14 and 40%;
    b) from 40 to 55% of one or more tackifying resin(s), each of the one or more tackifying resin(s) having a softening temperature of between 70 and 150° C., wherein the one or more tackifying resin(s) comprises a tackifying resin (i) comprising residues of aliphatic unsaturated hydrocarbons having from 5, 9 or 10 carbon atoms;
    c) from 4 to 20% of a hydrocarbon oil with an aromatic content less than 15%; and
    d) from 1 to 6% of a filler comprising a low number average molecular weight homopolymer or copolymer of polyethylene.

22. The HMPSA composition according to claim 16, wherein the composition exhibits a ΔE of from about 1.4 to about 2.5.

23. The HMPSA composition according to claim 17, wherein the composition exhibits a ΔE of from about 1.4 to about 2.5.

24. The HMPSA composition according to claim 18, wherein the composition exhibits a ΔE of from about 1.4 to about 2.5.

25. The HMPSA composition according to claim 21, wherein the composition exhibits a ΔE of from about 1.4 to about 2.5.

* * * * *